(12) United States Patent
Vembar et al.

(10) Patent No.: US 10,573,079 B2
(45) Date of Patent: *Feb. 25, 2020

(54) HYBRID RENDERING FOR A WEARABLE DISPLAY ATTACHED TO A TETHERED COMPUTER

(71) Applicant: Intel Corporation, Santa Clara, CA (US)

(72) Inventors: Deepak Shashidhar Vembar, Portland, OR (US); Paul Diefenbaugh, Portland, OR (US); Vallabhajosyula S. Somayazulu, Portland, OR (US); Atsuo Kuwahara, Portland, OR (US); Kofi Whitney, Hillsboro, OR (US); Richmond Hicks, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/937,649

(22) Filed: Mar. 27, 2018

(65) Prior Publication Data

US 2018/0218543 A1 Aug. 2, 2018

Related U.S. Application Data

(63) Continuation of application No. 15/262,369, filed on Sep. 12, 2016, now Pat. No. 9,928,660.

(51) Int. Cl.
*G06T 19/00* (2011.01)
*G06T 7/70* (2017.01)
*G06T 7/215* (2017.01)
*G06T 7/20* (2017.01)
*G02B 27/01* (2006.01)

(52) U.S. Cl.
CPC .............. *G06T 19/006* (2013.01); *G06T 7/20* (2013.01); *G06T 7/215* (2017.01); *G06T 7/70* (2017.01); *G02B 2027/0132* (2013.01); *G02B 2027/0134* (2013.01); *G02B 2027/0178* (2013.01)

(58) Field of Classification Search
CPC ............................... G06F 3/011; G06T 19/006
See application file for complete search history.

(56) References Cited

U.S. PATENT DOCUMENTS

| | | | |
|---|---|---|---|
| 7,002,551 B2 | 2/2006 | Azuma et al. | |
| 2006/0256110 A1 | 11/2006 | Okuno et al. | |
| 2007/0035562 A1 | 2/2007 | Azuma et al. | |
| 2008/0172201 A1* | 7/2008 | Kotake | G01C 11/00 702/150 |
| 2013/0176447 A1 | 7/2013 | Nakashima | |
| 2015/0206350 A1 | 7/2015 | Gardes et al. | |
| 2015/0348511 A1* | 12/2015 | Oriol | G06F 3/01 345/212 |

(Continued)

*Primary Examiner* — Ryan R Yang
(74) *Attorney, Agent, or Firm* — Finch & Maloney PLLC

(57) ABSTRACT

Hybrid rendering is described for a wearable display that is attached to a tethered computer. In one example, a process includes determining a position and orientation of a wearable computing device, determining a rate of motion of the wearable computing device, comparing the rate of motion to a threshold, if the rate of motion is above the threshold, then rendering a view of a scene at the wearable computing device using the position and orientation information, and displaying the rendered view of the scene.

20 Claims, 6 Drawing Sheets

(56) References Cited

U.S. PATENT DOCUMENTS

| | | |
|---|---|---|
| 2016/0049008 A1 | 2/2016 | Haddick et al. |
| 2016/0119536 A1 | 4/2016 | Carceroni et al. |
| 2016/0147064 A1* | 5/2016 | Border ................. G02B 27/017 345/592 |
| 2017/0293146 A1 | 10/2017 | Nicholls et al. |
| 2017/0374343 A1* | 12/2017 | Boulton ................. G06F 3/012 |

* cited by examiner

US 10,573,079 B2

HYBRID RENDERING FOR A WEARABLE DISPLAY ATTACHED TO A TETHERED COMPUTER

RELATED APPLICATION

The present application is a continuation of and claims the benefit of U.S. patent application Ser. No.: 15/262,369, filed on Sep. 12, 2016 and entitled "HYBRID RENDERING FOR A WEARABLE DISPLAY ATTACHED TO A TETHERED COMPUTER", and is incorporated by reference in its entirety.

FIELD

The present description relates to wearable displays that connect to an external data source for at least some of the display content and in particular to a hybrid rendering system for such displays.

BACKGROUND

Virtual reality (VR) displays allow for new user experiences by seemingly transporting the user to another world apart from the user's current location. In a typical configuration, the user wears a display over the eyes that completely or partially blocks the user's field of view. The display replaces the real world with that of another world. In some cases, the other world may be an alternative version or an augmented version of the user's current surroundings. As examples, the user in a living room may be shown images of an ocean beach instead of the living room, images of an ocean beach incorporating furniture and other objects in the living room, or the living room with additional elements that are not in the living room.

When the other world is mostly the user's current surroundings with added elements, that world may be an augmented reality (AR) system. AR headsets typically allow at least a partial view of the actual real current surroundings. This view may be rendered by a transparent display or by a display that completely blocks the user's view and then presents a live view of the surroundings as seen by a camera pointed in the same direction as the user's head.

When the other world is unrelated to the user's current surroundings, that world may be generated by a virtual reality (VR) system. VR headsets typically block the user's view of the actual real current surroundings. This view is generally rendered by a display that completely blocks the user's view and presents an animated view of a real or synthesized scene.

In both types of systems, as the user moves around, the scene shown in the display is updated to reflect the movement. As an example when the user turns to the right, the displayed scene is changed to show objects to the right of those previously displayed. When the user moves forward objects displayed as being in front of the user are displayed as if they are closer. This provides an element of realism that makes it seem as if the user is actually looking and moving around and through the world presented as the virtual reality.

Several different designs have been presented for head mounted displays (HMDs). In most cases, there is a piece of headwear, such as goggles, glasses, a hat, or a helmet that includes a separate display for each eye. The use of separate scenes for each eye enables the introduction of stereoscopic cues that present an element of depth to the virtual world. Speakers or earpieces are used to present stereo sounds and there may be some sort of user interface with buttons, a hand controller, or gestures. The device generally includes an Integrated Motion Unit (IMU) that detects head position and movement.

In one class of devices, a smart phone with a specialized application is mounted to a specialized wearable holder that places the smart phone screen directly in front of the user's eyes. The application splits the screen view into two sections to show a different view to each eye. The smart phone is used for all of the motion sensing, image rendering, and communications with external data sources. The external data sources provide the data that describes the virtual world. In another class of devices, the user wears a separate display and speaker unit that is tethered with a cable or wirelessly to a computer. The simple headset sends inertial and positional data to the computer and then renders whatever it receives. The computer does all the computation and scene adjustments in response to the user's actions.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
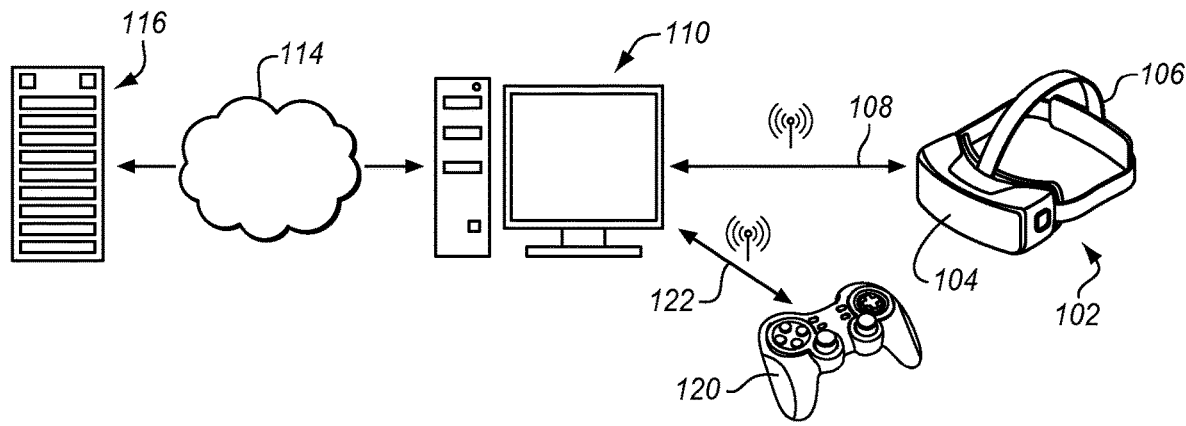
FIG. 1 is a diagram of a virtual reality system suitable for use with embodiments.

A smart phone based headset avoids some of the cost of a separate specialized headset, but the experience is compromised because the smart phone is not specifically designed for this use and may be heavier and unbalanced compared to a specialized headset. In addition, virtual reality places a high load on both compute and battery life as well as a large strain on the wireless data connection. Such a system only works under ideal conditions and then only for a short time.

A tethered headset leverages a physically large and high-powered compute device to provide better graphics. In addition, placement of compute outside the headset, as well as a specialized design may enable lower weight, a better field of view, and a more comfortable fit. In addition, the more flexible and more powerful computing abilities of a separate computer provide higher fidelity graphics for the head mounted display (HMD) at lower latency and higher resolution. On the other hand, if the computer sends full video frames and audio to the headset, the bandwidth demands on the tethered connection are very high. A high fidelity stereo view may require a minimum of two 1080 p video frames at 60 fps with related audio in order to be convincing. For fully immersive experiences studies suggest that both higher resolution (~3,000 by 3,000) and higher frame rates (90-120 FPS) are required.

The VR pipeline runs from the source of the virtual world, through some sort of computing resources to interpret, analyze and present the virtual world, to a display presented to the user. It also runs from inertial and user interface inputs from the user to the computing resources and possibly also to the source of the virtual world. The source may be local or remote. The presentation and experience of VR requires significant source and computing resources to make the experience responsive, realistic, and lively. Any delays in the presentation or in responding to user input will interfere with the sense of realism, and in some cases may induce nausea and motion sickness. When a large amount of data is transmitted over wireless links there is a significant risk that the experience will be compromised by latencies that are inherent in the system.

As described herein a hybrid computing architecture may be used to enhance the VR experience. In this architecture, some of the rendering is performed at the headset or HMD and other rendering tasks are performed by a separate, more powerful system. The rendering may be partitioned between the local computing on the HMD and the remote computing on the tethered computer to optimize bandwidth, latency, and quality of the display rendering.

Aspects of human visual perception may be used to determine how to partition rendering of frames. As described herein frames are rendered in full detail, resolution, and frame rate when a user is holding the head still and focusing on a particular area of the display or in other words looking at a particular area in the virtual world. The full detail may apply to the complete scene. In the case of systems incorporating eye tracking, the full detail may be applied only to the region of the display that appears in the center of the user's field of view (i.e. Foveated Rendering). On the other hand when the user moves the head or the eyes very quickly, then frames are rendered with less detail. This may mean less resolution, fewer colors, more compression, and even a lower frame rate. The motion of the head may be determined with accelerometers on the head mounted display. The motion of the eyes may be determined with an eye tracker.

In human visual perception, when a person is moving the head slowly, the person is usually scanning an area looking for any interesting details as the head moves. This is true for unaided vision in real scenes and establishes an expectation for users with virtual scenes. On the other hand, when a person is moving his gaze quickly from one position to another, the person is not able to focus clearly on any particular object in a real scene until the motion stops. This applies whether the user is adjusting his gaze by head or eye movement. The eyes may be scanning the scene if the eyes are moving slowly, but during saccadic or quick movement, the eyes are only looking at where to stop and not looking closely at anything in between the start and stop positions. Saccadic movement is a quick or jerky movement of the eyes during which the user's gaze is transferred from fixing at one point in the scene to fixing at another point in the scene.

In other words, when the user is shaking the head, or is performing very fast saccadic motion of the eyes, the human visual system does not really focus on the scene in front of the user and all the objects in front of the eyes are perceived at relatively low resolution. For rendered visuals in virtual reality, the same thing occurs. Any fidelity beyond what the user is able to perceive during these changes in gaze direction is transparent to the user and represents wasted compute. This characteristic of human perception may be used to reduce the quality of rendered visuals during rapid gaze changes without affecting the user's perception of the scene. The rapid motions of the head and the eye may be used to determine when the speed of the motions is above a threshold. During these times the rendered visuals may be reduced to a lower level of detail, such as lower resolution, less color detail, lower frame rates, and other reductions.

In some cases, the lower detail visuals may be rendered locally in a processor of the head mounted display instead of on a remote source. This offers at least two distinct benefits. Local rendering will save the remote source from sending rendered frames over the wireless link until new frames are needed for the new area of attention. At the same time the user does not perceive any difference in the visual quality of the scene. A rapid user head movement may take 200 ms to move from facing one side to facing the other. For a typical virtual reality rendering system, this may correspond to 10-50 frames that are not sent over the wireless link during the head movement. A second benefit is that the local compute has lower latency access to the IMU data used to assess head and eye position and can therefore respond with lower latency to large changes in the direction of the user's gaze. As mentioned lower image fidelity will not be perceived. Partitioning the workload between a low latency, low power compute node and a higher latency higher power compute node provides an improved balance between latency and power. The reduction in latency serves to eliminate motion sickness that can occur when the display update lags the head or lags eye motion.

As mentioned above, HMDs may receive data about the virtual world from many different sources. These include local and remote storage. Details may be generated based on software instructions and in response to user cues. FIG. 1 is a diagram of high performance HMD with multiple remote information sources. An HMD 102 has a main body 104 and an attachment strap 106. The main body carries user displays and speakers to render the virtual world to the wearer. The main body also has inertial sensors, a microphone and other user input devices. A processing, communications, and power or battery suite allow the HMD to render video and sound and to communicate wirelessly 108 with a tethered computer 110.

The user interacts with the virtual world through head and body movements and may also interact using voice commands, hand gestures and other user input devices. A game controller 120 may be coupled to the tethered computer through the same 108 or another 122 wireless interface to provide additional controls. The HMD may be coupled to the computer through a WiFi, WiDi, or other high speed digital wireless connections to receive rendered or compressed video frames and audio from the computer for display to the user. Additional descriptions, data, parameters, and commands may also be received from the computer. The HMD may also send command, control, and virtual interaction data to the computer through the same or another wireless link. The controller, for example may communicate through Bluetooth or unlicensed bands. Multiple wireless interfaces may be combined to provide the complete user experience.

In some cases, the computer is portable and carried by the user. This allows for a wired connection, if desired. The carried computer may have a notebook, tablet, smartphone, or any other desired physical configuration. In other cases, the computer is fixed and is attached to the HMD using a wired connection.

The computer may in turn be connected through the Internet, a LAN (Local Area Network) or other connection 114, wired or wireless, to a remote server 116. The remote server provides additional information about the virtual world. The remote server may also provide communication with other users that are experiencing the same or a related virtual world. Alternatively, the HMD may communicate directly with the server without going through the computer 110. In other embodiments, no remote server is used and the tethered computer operates independently.

In the examples herein, a wireless HMD has a local computing resource, such as a CPU (Central Processing Unit) that may be coupled to a GPU (Graphics Processing Unit), graphics processor, memory and other resources to allow the HMD to store and render models. The local rendering is augmented by a more powerful graphics pipeline to perform rendering at the computer and transmit the rendering data over the links from the computer or directly from a cloud compute service. At high resolutions and fast refresh rates, the rendered graphics transmitted over the wireless link may become a large amount of data. This may lead to link congestion and a poor user experience due to dropped frames.

Figure 2:
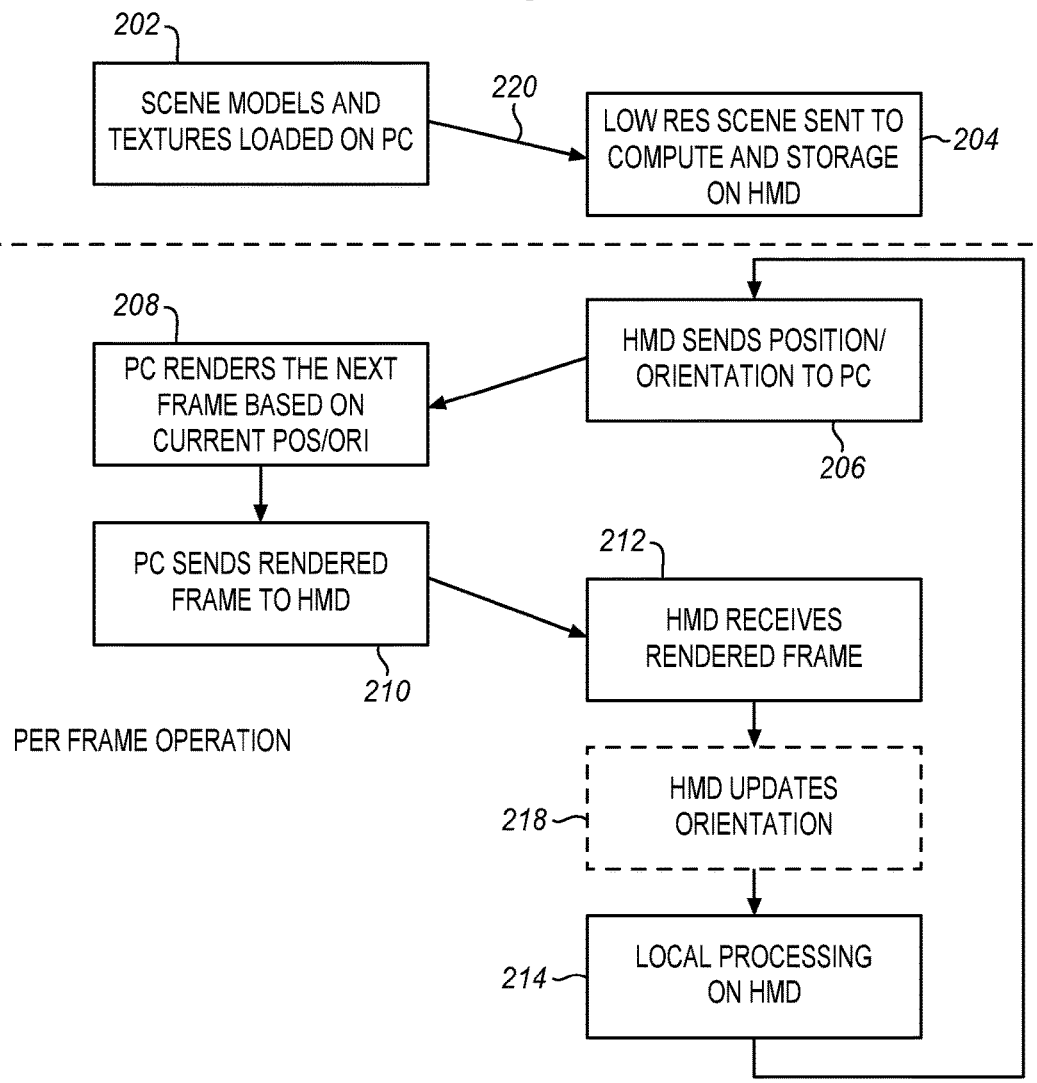
FIG. 2 is a process flow diagram of hybrid rendering in a virtual reality system according to embodiments.

FIG. 2 is a process flow diagram of rendering virtual reality using a tethered HMD. In this case there are compute and rendering resources on both ends of the link. The compute workload is partitioned between the low power graphics processor on the HMD 102 and the workstation 110 that is then sent over connection 108. The workstation may be a local computer 110 or a remote server 116 or both, depending on the implementation.

The local computing resources on the HMD may include an IMU (Inertial Measurement Unit) to send head and body positional data to the tethered computer as well as a CPU with or without a coupled GPU. The HMD may also include a gaze detection system to determine a direction of the user's eyes. The tethered computer has a higher powered CPU and a more powerful GPU, so it can render the virtual world at higher fidelity, including resolution and frame rates. The high fidelity frames are sent over the link to the HMD for display to the user. The wireless transmission requires compute, energy, and is not very smart. In this example, the HMD has some rendering capabilities but is not as fast or powerful as the tethered computer. In general a high fidelity version of the scene is rendered on the PC and then sent over the link to the HMD. The local compute on the HMD may augment this scene based on access to low latency information from the IMU and may further incorporate frame rate conversion to increase the frame rate and reduce the latency required to respond to eye/head movement.

FIG. 2 is a process flow diagram of rendering a scene on a tethered HMD or other virtual display. In this example, the system responds to head motions to change the scene that is viewed by the user of the HMD by changing the scene that was rendered by the tethered computer. The process flow applies to the normal operating procedure for wireless transmission of rendered frames from a PC to a wireless HMD, among other types of systems. A different type of wearable computing device may be used instead of the HMD. While the HMD is referred to as a display, it also includes computing, communicating, and rendering resources as described above. As mentioned above in the context of FIG. 1, the tethered computer may be connected through a wireless link, through a cable, or through a network connection. At 202, the tethered computer models a virtual scene and generates textures for the virtual scene. These are generated or received by the tethered computer and sent 220 across the wired or wireless link to the HMD. The HMD receives a low resolution version of the scene where it is stored. At this stage, the HMD is ready to start virtual reality operation.

At 206 the HMD is rendering the initial frames of the virtual scene and detecting head motion of the user. The HMD may also detect eye movement and other body motions. The HMD sends position and orientation information to the tethered computer. At 208 the tethered computer renders the next frame based on the received position and orientation information. The tethered computer tracks a position and gaze direction of the user. This is used to determine an appropriate scene of the virtual world to render. As the user moves and the HMD sends position and gaze direction updates to the tethered computer, the tethered computer updates its traced position and orientation information. The position and orientation information may be sent through a WiFi link, Bluetooth, cellular, or any other suitable connection. The position and orientation information may be combined with other information such as commands from a controller or other user interface.

At 208 the tethered computer renders a next frame using either the current position, or a predicted future position based on orientation information received from the HMD at 206. The tethered computer may be configured to predict a future gaze or head direction using a Kalman filter or other technique. The prediction may be set to predict where the user will be looking when the scene is displayed by considering the expected latency between the tethered computer and the display and based on the user's past movements.

The tethered computer may also receive additional commands or situational information from other local or remote users for a multiuser or automated interaction. The tethered computer then sends this information to the HMD as rendered frames. This will be sent through a wireless link such as WiFi, WiDi, or another type of connection. At 212 the HMD receives the new frames usually on a frame-by-frame basis and renders the received frames to the user. The HMD may optionally determine updated orientation information at 218 from the IMU of the HMD and apply the updated information for a local time warp operation. At 214 local processing is performed on the received frames by the HMD which may include a time warp on the received frame and generating additional in between frames to increase the frame rate.

In one example, an asynchronous time warp may be performed depending on the particular implementation. This time warp may be used to accommodate updates to the eye or head position that have occurred since the frame was rendered by the tethered PC and may additionally improve the effective frame rate by repeating the original frame, modified by continuous updates based on changes to the users eye/head position. The process then repeats to send updated position and orientation information to the tethered computer at 206 as the user moves through the virtual scene.

Figure 3:
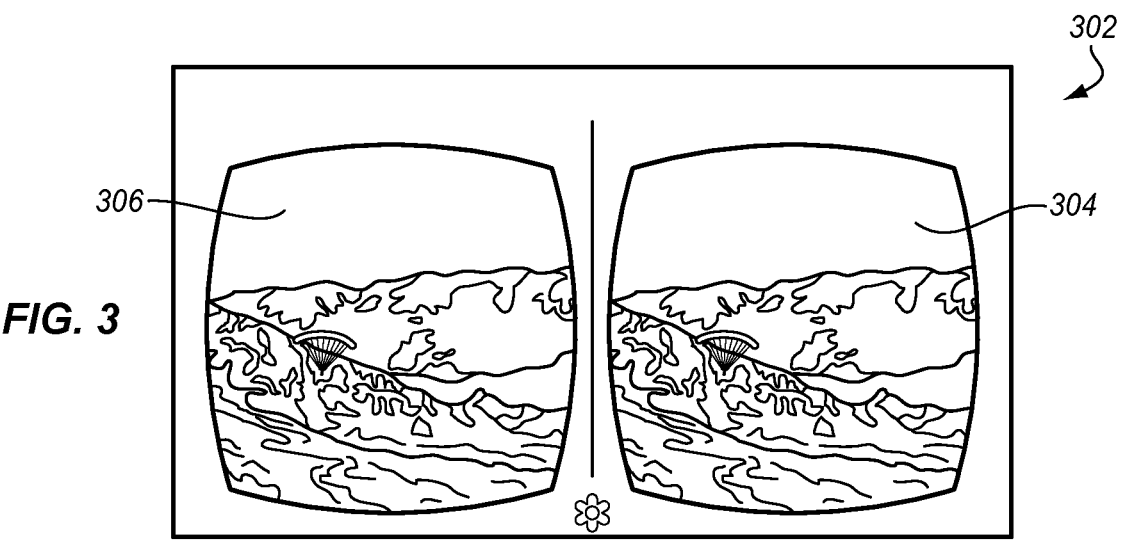
FIG. 3 is a diagram of an enlarged frame rendered for a virtual reality system according to embodiments.

A time warp may use a process in which the tethered computer renders a larger frame than the HMD displays. FIG. 3 is a diagram of an example of a frame 302 that may be rendered by the tethered PC. The frame has a left eye section 306 and a right eye section 304. The larger frame allows for a margin or border around the displayed frame that is not displayed.

Figure 4:
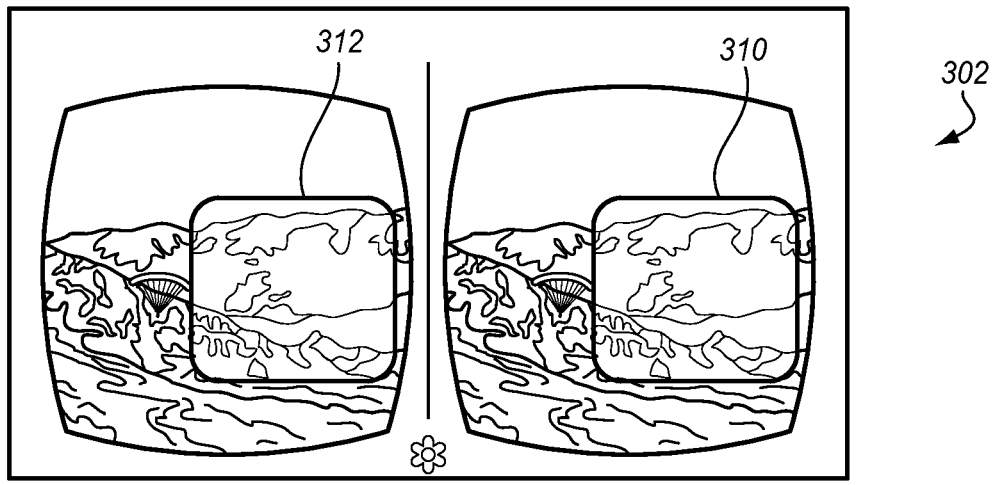
FIG. 4 is a diagram of a first partial view of an enlarged frame rendered for a virtual reality system according to embodiments.

FIG. 4 is a diagram of the same frame 302 with left and right frame lines 310, 312 indicating an area of the frame to be displayed to the user. If the user moves in any direction within the margin provided by the overall images of the frames 304, 306, then the HMD is able to immediately respond by shifting the part 310, 312 of the frame that is displayed in the appropriate direction.

Figure 5:
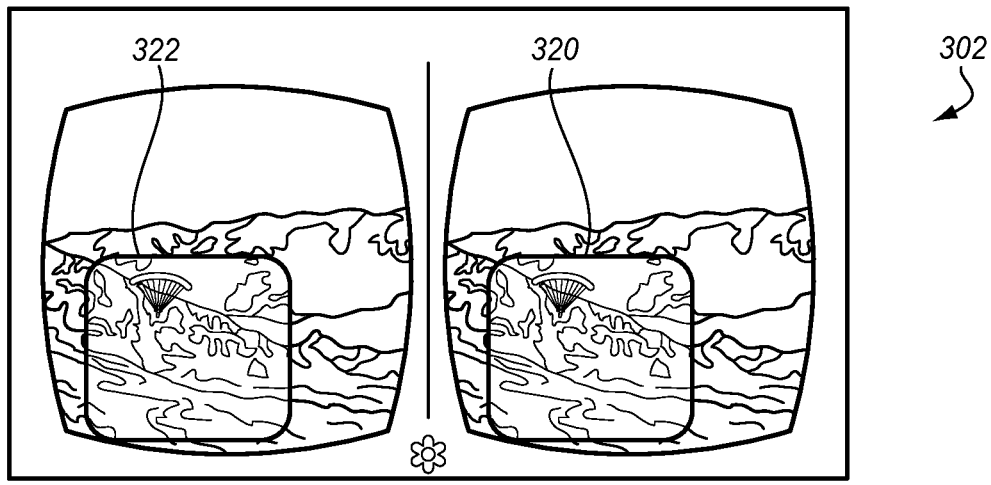
FIG. 5 is a diagram of a second partial view of an enlarged frame rendered for a virtual reality system according to embodiments.

FIG. 5 is a diagram of the same frame 302 with different left and right frame lines 320, 322 indicating a different area of the frame to be displayed to the user. This different area corresponds to a move of the user's head or gaze. As long as the user does not go beyond the extra margin around the frame, the HMD can respond using the rendered frame that it has received. A significant benefit of this approach is that the HMD may incorporate these modifications based on the availability of low latency inputs from the IMU, reducing the latency between a user movement and the resulting display update.

In other words, the PC is able to respond only after it receives position information and then renders a frame that is sent to the HMD. There is latency in the transmission of the orientation information to the PC, in rendering the frame, in transmitting the frame and then in displaying the transmitted frame. In some systems, the PC receives an orientation update after rendering the frame. The PC then makes a modification to the rendered frame using the new orientation information before sending the rendered frame. This eliminates some but not all of the delay.

In the example of FIG. 2, the HMD receives the frame and then performs the time warp locally without any delay from the PC. As shown, the HMD optionally updates the orientation information 218 after receiving the rendered frame from the PC 212. This updated information may then be used to select a portion of the full frame from the PC. This selected portion of the frame is displayed for the user on the HMD. The resulting warped frames provide a more immediate response and therefore a more realistic experience.

As an example for a 1920×1080 display on the HMD, the tethered computer may supply a 2560×1440 frame. This would provide a large margin of 320 pixels on each side of the rendered frame and 240 pixels above and below the displayed frame. By having the additional information available in the rendered frame, motion related latency can be reduced by the HMD without affecting the frame rate and without requiring additional orientation adjustments at the tethered computer. Any visual artifacts from missed frames can also be reduced in case a frame takes too long to render. Because it is done by the HMD using the HMD's sensors and the frame information already available, comparatively little computation is required and no extra communication through the link between the HMD and the tethered computer.

Another type of local processing is to increase the frame rate. At present VR enthusiasts prefer frame rates of 60 fps (frames per second) or above. On the other hand, due to the immersive environment of VR and stereoscopic video requiring two frames for each scene, many computers are not able to reach 60 fps and instead render at lower speeds. In the example of FIG. 2, a tethered computer can render the video at 30 fps and the local graphics processing resources may be used to render in between frames. This has been referred to as double rate warping. The local processing resources generate an additional frame for each frame from the tethered computer, insert the generated frame between received frames and display the additional frame in the video stream so as to achieve 60 fps. The additional frames may be duplicates of the previous frame updated for any change in HMD orientation.

The same principle may be used to achieve a 120 fps video with a 30 fps source or a 90 fps video with a 45 fps source or any other desired frame rate. The HMD may generate 1, 2, 3, or more frames in between the frames from the tethered computer. This technique may also be used to increase the frame rate in response to fast head or eye motions, as described in more detail below. By lowering the transmitted frame rate from the tethered computer, processing demands on the tethered computer may be reduced. In addition, less data is required to be transmitted from the tethered computer. Lowering the frame rate reduces demands on the wired or wireless link between the tethered computer and the HMD.

As mentioned above, with fast user head motions, the tethered computer must similarly perform fast updates of the rendered frames. Even if the frame rate is the same as for slow head motions, the content of the frames changes more. Many video rendering, compression, and transmission systems rely on the frames staying largely the same and render mostly compressed frames which consist of changes to the previous frame. When a frame is very different from the previous frame, more resources are required to provide it to the HMD and for the HMD to render it. If the user has moved the head so as to be looking at a different part of the scene, then the next frame may be very different from the previous frame. On the other hand, since the user is not able to see clearly during fast head motions, the system of FIG. 3 is able to use local processing on the HMD to reduce the extra load on the system by rendering the frames with lower resolution or less detail. This avoids the negative experiences of the frames not changed after a head movement or of the display going blank, which noticeably degrade the user experience.

The local processing may also be used to reduce the frame rate. If there is a static scene, for example, the user is not moving the head very much and objects in the scene are still or moving slowly, then a lower frame rate may be used. The tethered computer may save power and reduce heat by rendering slowly, or in this case, the HMD may save power by rendering less than all of the frames. In a simple example, the HMD may render only every other frame reducing a frame rate from 60 fps to 30 fps or 30 fps to 15 fps. Other reductions may also be provided. These may be simple or complex depending on how the video is encoded or sent to the HMD. This may be referred to as half rate warping.

Figure 6:
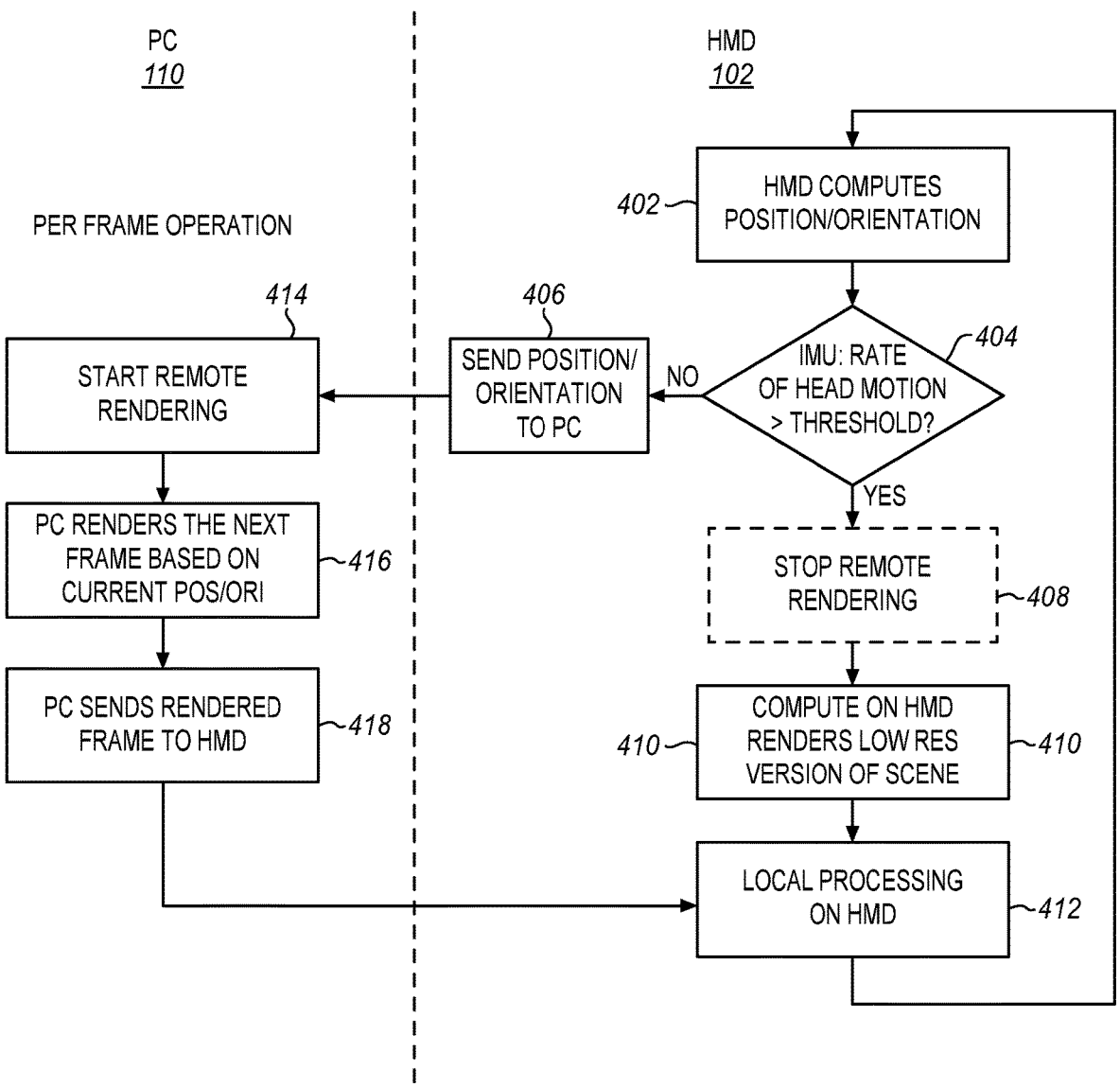
FIG. 6 is a process flow diagram of rendering a scene in virtual reality with fast head motion according to embodiments.

FIG. 6 is another process flow diagram of rendering a scene on a tethered HMD or other virtual display. In this example, the system is attentive to fast head motions to change the operation of the HMD 102 and the tethered computer 110. The smart rendering offloads rendering from the PC when the head motion changes are above a certain threshold. In this case, the streaming over wireless links may optionally be stopped and the HMD does local, lower resolution rendering of the scene model that was established at initiation or later updated in the background. As mentioned previously, the lower quality of this scene is not objectionable (or detectable) to the user during periods of fast eye or head motion, whereas the user remains highly sensitive to the corresponding latency which might occur if the tethered computer were not able to change the scene view quickly enough to keep up with the head or eye movement.

The process begins with an initiation process as in FIG. 2 in which the scene models and textures are sent to the HMD and loaded. There may also be other parameters for the virtual world, recognized commands, and other features. These are then used by the HMD to initiate the virtual reality session for the user on the HMD. The use may be presented with some start up questions and a general orientation to the virtual world.

At 402 the HMD computes the position and the orientation of the user's head or gaze or both. This is sent to the tethered computer. At 404 the rate of head motion is determined by an IMU (Inertial Measurement Unit) of the HMD. This rate of movement is compared to a threshold that is derived based on characteristics of human perception. If the head motion rate is below the threshold, then the HMD continues as is normal. A standard position and orientation update signal with or without a NO signal is sent at 406 to the tethered computer. The tethered computer responds by starting the remote rendering at 414. The tethered computer then renders the next frame at 416 based on the received position and orientation information. At 418 it then sends that rendered frame to the HMD. The HMD receives the rendered frame and displays it to the user at 412 with any time warp adjustment or additional processing that may be suitable.

On the other hand if the head movement is faster than the threshold, then the HMD may optionally send a message 408 to the tethered computer at to stop the remote rendering. Instead of showing the remotely rendered frames, the HMD renders a lower detail view of the current scene at 410. At 412, any additional local processing is applied at the HMD and the scene is rendered to the user. The additional processing may be time warp adjustments or additional generated in between frames. With fast eye and head movements, a user may be particularly susceptible to nausea caused by lower frame rates. The HMD may locally generate a higher frame rate during these times of fast movement to compensate for this effect in some users. With the next movement, the HMD returns at 402 to compute a new position and orientation and compare the rate of movement to the threshold at 404.

If the stop rendering signal is used at 408, then when the tethered computer receives the stop remote rendering signal, it stops rendering and then waits for the next position and orientation update. This wait time may correspond to only 10-60 frames but it allows all of the rendering buffers in the tethered computer to refresh and allows any latency in the tethered connection to recover. When the new position and orientation are received, the updated new frame may be rendered and sent without delay. If the stop rendering signal is not sent, then the tethered computer continues to render frames with received position and orientation updates and send the frames to the HMD. These frames are normally not used by the HMD until the rapid head or eye movement stops or slows.

The lower detail scene that is displayed at 410 may have a lower resolution, lower color detail, and other reductions in detail. As an example, instead of a 1920×1080 frame sequence with 12 bit color, the HMD may provide an 800×480 frame sequence with 8 bit color. For YUV, the color coding may go from 4:2:0 to 4:0:0, etc.

In summary the IMU of the HMD determines how fast the eye or head is moving. If the speed of the movement is above a threshold, the HMD uses local compute and rendering on the HMD, uses a low-res model of the scene, and renders it locally. This low res model may be sent by the tethered computer during scene loading of a game and it may be updated as a background process. The frame rate may also be increased with the local rendering. When the head movement falls below the threshold, the HMD resumes reliance on the rendered frames from the tethered computer. For the user, there is no difference in resolution because the user is not able to focus and see detail during rapid movements. On the other hand, since the display maintains a view of the scene that corresponds to the head movements, the user is not disoriented and the reality of the presentation is not lost and latency related motion sickness is avoided.

Figure 7:
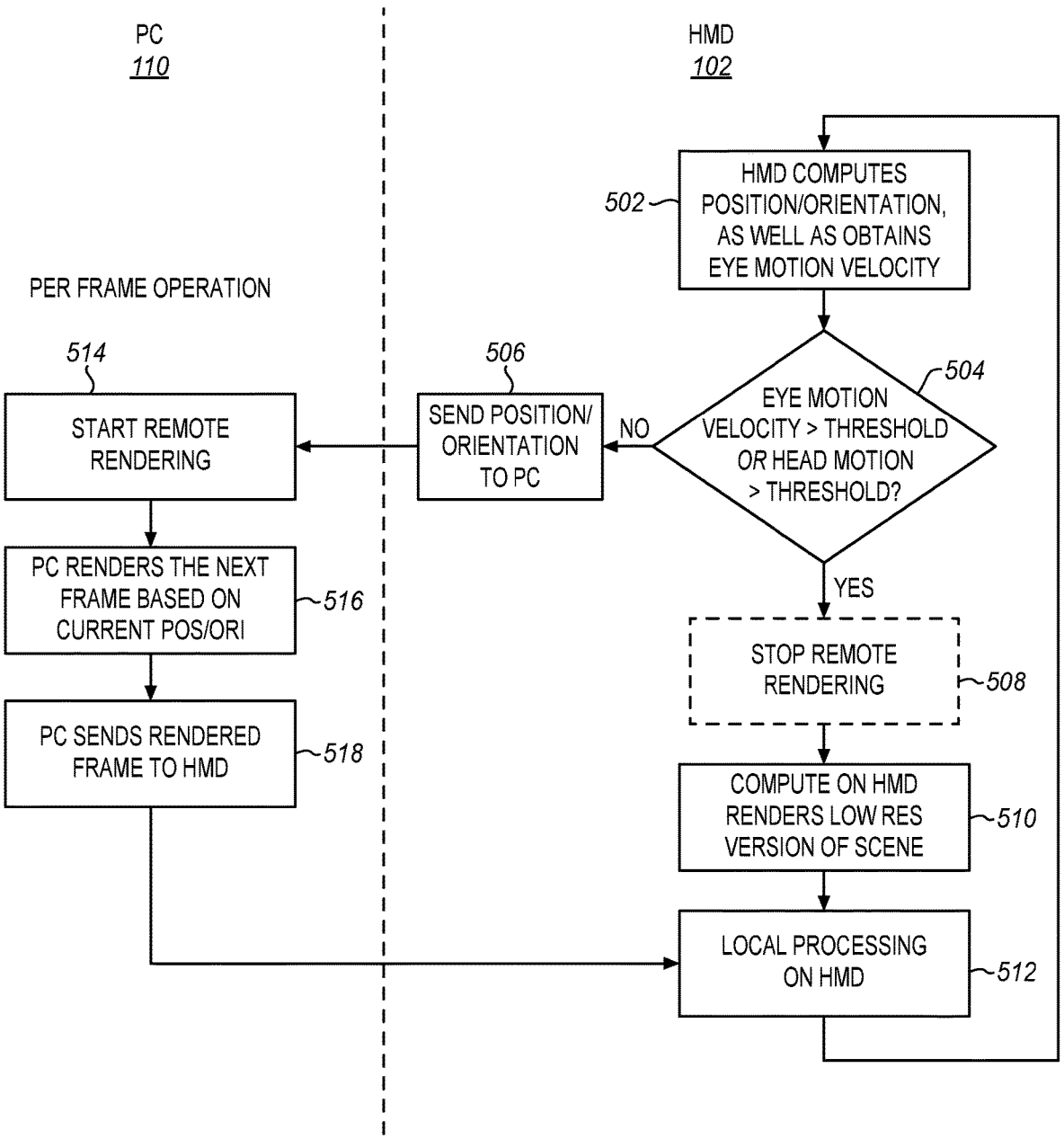
FIG. 7 is a process flow diagram of rendering a scene in virtual reality with fast head motion and fast eye movement according to embodiments.

FIG. 7 is an alternative process flow diagram of rendering a scene on a tethered HMD or other display. In this example, the system not only detects fast head movements, but also fast saccadic motions of the eye on the HMD. In this example, the HMD has an attached eye tracker. The eye tracker is used to determine the direction of the user's gaze. Eye tracking is used in virtual reality to provide an additional selection control, to support foveated rendering and may also be used to create a perception of a wider field of view. When the user moves the eyes, the eye tracker can use the time warp to shift the display's view of the scene in the direction in which the viewer is looking. This provides a perception that the display is wider than it actually is.

On the other hand, when a user quickly moves the eyes from one position to the next, a saccadic motion, the user is not able to perceive details until the eyes stop and settle on a subject. Regardless of any other uses of the eye tracker, the eye tracker of the HMD may be used to detect saccadic motion and briefly render images locally for the 5-20 frames during which the eyes are moving. The graphics pipeline may be optimized to show high detail when a user is smoothly or slowly pursuing an object with the eyes. The graphics pipeline may then be stopped for frames that will not be seen. As a result, the wireless transmission data rate may be reduced when the user is making rapid eye motions. Wireless transmissions are resumed when the rate of eye motion falls back below that threshold.

In FIG. 7, the system is first initialized (FIG. 2) then the HMD computes the position and orientation and tracks the eye movements at 502. At 504, the eye motion velocity is compared to a threshold for eye motion while the head motion is compared to a head motion velocity threshold. If the eye motion and the head motion are normal and not above the threshold, then the HMD sends the current position and orientation to the tethered computer at 506. The HMD may also send the tracked eye position to the tethered computer. At 516, the tethered computer renders the next frame based on the received head position and orientation and optionally based on prediction models forecasting the eye or head position when the image is displayed accounting for expected system latencies. The eye tracking data may also be used as an object selector, for foveated rendering or for any other supported function. The rendered frame is then sent to the HMD.

The HMD receives the rendered frame and displays it to the user as a new updated frame at 512. The display may include an asynchronous time warp or other local processing as in FIGS. 2 and 6. The process returns to determine the new head position and orientation and to track the eyes at 502.

If the head movement or the eye movement is faster than the respective threshold, then at 508, the HMD optionally sends a signal to the tethered computer to stop the rendering. The HMD then computes and renders its own low resolution version of the scene at 510. Additional processing such as generating in between frames, reducing resolution, time warp, etc. may be applied to this rendering. As soon as the frame generated by the HMD is displayed the process returns to determine the new position, orientation and eye position at 502. The HMD may continue to render low resolution frames of the scene for 5, 10, 50 or more cycles until the head and eye movement are both below the threshold values.

This approach allows the HMD to offload rendering from the tethered computer under limited circumstances. This allows for optimization of tradeoffs between head or eye movement response latency and image fidelity given finite bandwidth between the HMD and tethered computer.

Figure 8:
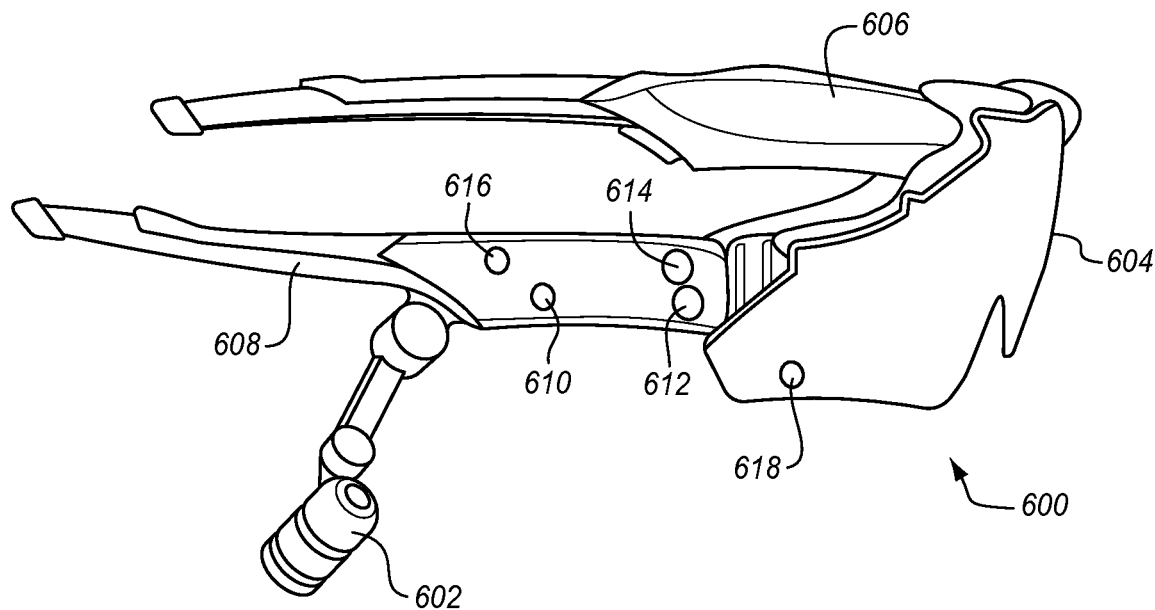
FIG. 8 is an isometric view of a wearable device with IMU and display according to an embodiment.

FIG. 8 is an isometric view of a wearable device with display, and wireless communication as described above. This diagram shows a communication glasses device 600 with a transparent, semi-transparent front display for informational displays or augmented reality. Alternatively, the display may be opaque and completely fill the user's view for virtual reality purposes. However the head-mounted display 600 may be adapted to many other wearable, handheld, and fixed devices. .

The communication glasses of FIG. 8 have a single full-width lens 604 to protect the user's eyes and to serve as a binocular or stereo vision display. The lens serves as a frame including a bridge and nosepiece between the lenses, although a separate frame and nosepiece may be used to support the lens or lenses. The frame is attached to a right 606 and a left temple 608. An earbud 602 and a microphone 610 are attached to the right temple. An additional earbud, microphone or both may be attached to the other temple to provide positional information. In this example, the communication glasses are configured to be used for augmented reality applications, however, a virtual reality version of the head-mounted display may be configured with the same form factor using gaskets around the lens to seal out ambient light. A head strap (not shown) may be attached to the temples to wrap around a user's head and further secure the display 600.

The communication glasses are configured with one or more integrated radios 612 for communication with cellular or other types of wide area communication networks with a tethered computer or both. The communications glasses may include position sensors and inertial sensors 614 for navigation and motion inputs. Navigation, video recording, enhanced vision, and other types of functions may be provided with or without a connection to remote servers or users through wide area communication networks. The communication glasses may also or alternately have a wired connection (not shown) to a tethered computer as described above.

In another embodiment, the communication glasses act as an accessory for a nearby wireless device, such as a tethered computer (See FIG. 1) connected through the radios 612. The user may also carry a smart phone or other communications terminal, such as a backpack computer, for which the communications glasses operate as a wireless headset. The communication glasses may also provide additional functions to the smart phone such as voice command, wireless display, camera, etc. These functions may be performed using a personal area network technology such as Bluetooth or Wi-Fi through the radios 612. In another embodiment, the communications glasses operate for short range voice communications with other nearby users and may also provide other functions for navigation, communications, or virtual reality.

Figure 10:
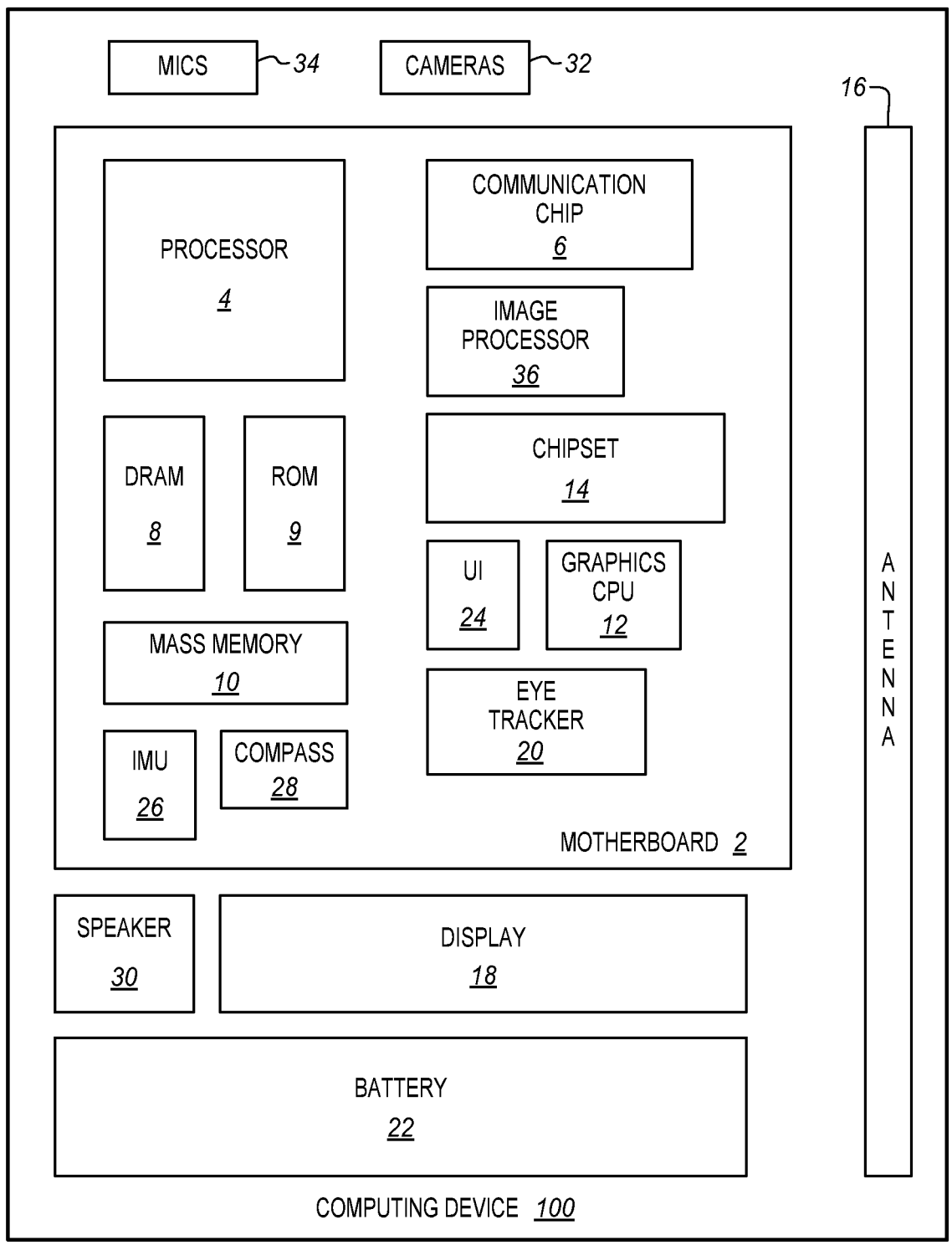
FIG. 10 is a block diagram of a computing device according to an embodiment.

The display glasses include an internal processor 616 and power supply such as a battery (shown in FIG. 10). The processor may communicate with a local smart device, such as a smart phone or tethered computer or with a remote service or both through the connected radios 612. The display 604 receives video from the processor which is either generated by the processor or by another source tethered through the radios 612. The microphones, earbuds, and IMU are similarly coupled to the processor. The processor may include or be coupled to a graphics processor, and a memory to store received scene models and textures and rendered frames. The processor may generate graphics, such as alerts, maps, biometrics, and other data to display on the lens, optionally through the graphics processor and a projector.

The display may also include an eye tracker 618 to track one or both of the eyes of the user wearing the display. The eye tracker provides eye position data to the processor 616 which provides user interface or command information to the tethered computer. In addition, the processor may use the eye tracker to determine if there is saccadic eye movement and revert to local rendering as mentioned above.

Figure 9:
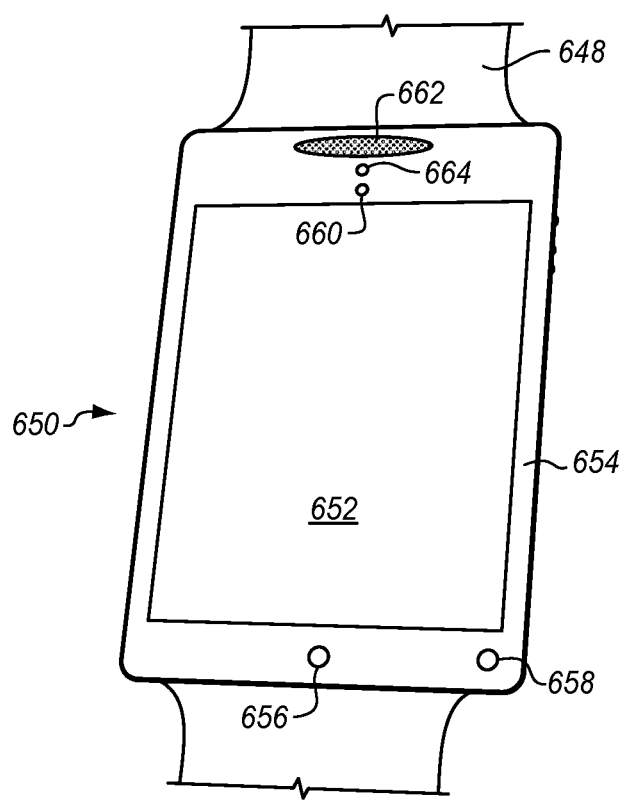
FIG. 9 is an isometric diagram of a wearable tablet or phone with an IMU and display according to an embodiment

FIG. 9 shows another example of a wearable display as a watch, a portable tablet, or a smart phone. The tablet or watch 650 has a strap 648 to attach to a wrist, arm, or other convenient place. It includes a display 652 and a bezel 654. In this example, the bottom part of the bezel below the display houses a microphone 656 and an eye tracker 658. The top of the bezel above the display houses a speaker 662. This is a suitable configuration for a smart phone or a watch and may also be adapted for use with other types of devices. The bezel also houses a camera 660 and a white LED 664. The various processors, radios, cord connectors, user interfaces, and other components discussed above may be housed behind the display and bezel or in another connected component.

The particular placement and number of the components shown may be adapted to suit different usage models. More and fewer microphones, speakers, and LEDs may be used to suit different implementations. Additional components, such as proximity sensors, rangefinders, additional cameras, and other components may also be added to the bezel or to other locations, depending on the particular implementation.

The wearable display of FIG. 9 may provide local rendering when the user is moving very quickly or when the display is moving very quickly. In either case, the user will not be able to focus clearly on the details of a displayed frame.

The wearable displays of FIGS. 8 and 9 are provided as examples but different form factors such as a helmet, sports goggles, or a headset, may be used, among others. The microphones and speakers may be located in a separate housing from the display and may be disconnected from the display bezel, depending on the particular implementation. Additional components, such as controller, user interface devices, and cord connectors may be provided as accessories to the displayed form factors.

FIG. 10 is a block diagram of a computing device 100 in accordance with one implementation suitable for use as a wearable display or as a tethered computer. The computing device 100 houses a system board 2. The board 2 may include a number of components, including but not limited to a processor 4 and at least one communication package 6. The communication package is coupled to one or more antennas 16. The processor 4 is physically and electrically coupled to the board 2 and may also be coupled to a graphics processor 36.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18, an eye tracker 20, a battery 22, an audio codec (not shown), a video codec (not shown), a user interface, such as a gamepad, a touchscreen controller or keys 24, an IMU, such as an accelerometer and gyroscope 26, a compass 28, a speaker 30, cameras 32, an image signal processor 36, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The display may be mounted in housings as described above that include straps or other attachment devices to make the display wearable. There may be multiple housings and different processing and user input resources in different housing, depending on the implementation. The display may be placed in a separate housing together with other selected components such as microphones, speakers, cameras, inertial sensors and other devices that is connected by wires or wirelessly with the other components of the computing system. The separate component may be in the form of a wearable device or a portable device.

The computing device may be fixed, portable, or wearable. In further implementations, the computing device 100 may be any other electronic device that processes data or records data for processing elsewhere. In various implementations, the computing device 100 may be a tethered computer in the form of a laptop, a netbook, a notebook, an ultrabook, a smartphone, a tablet, an ultra mobile PC, a mobile phone, a desktop computer, a server, a set-top box, or an entertainment control unit.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes determining a position and orientation of a wearable computing device, determining a rate of motion of the wearable computing device, comparing the rate of motion to a threshold, if the rate of motion is above the threshold, then rendering a view of a scene at the wearable computing device using the position and orientation information, and displaying the rendered view of the scene.

Further embodiments include repeating determining the position and orientation, determining the rate of motion, comparing the rate of motion, and if the rate of motion is below the threshold, then sending the determined position and orientation to a tethered computer, receiving a rendered frame from the tethered computer based on the sent position and orientation, and displaying the received rendered frame.

In further embodiments rendering a view comprises rendering a frame with less detail than a frame received from the tethered computer.

In further embodiments rendering a frame with less detail comprises rendering a frame with less resolution than a frame received from the tethered computer.

In further embodiments rendering a view comprises rendering a view using a scene model received from the tethered computer and the determined position and orientation.

Further embodiments include receiving scene models and textures from the tethered computer before determining a rate of motion.

In further embodiments the wearable computing device is a head-mounted display and wherein determining a position and orientation comprises determining the position and orientation at the head-mounted display using an inertial measurement unit of the head-mounted display.

Further embodiments include determining a rate of change of a gaze of a user of the wearable computing device, comparing the rate of change to a gaze threshold, if the rate of change is above the gaze threshold, then rendering the view of the scene at the wearable computing device at the head mounted computing device using the position and orientation information, and displaying the rendered view of the scene.

Further embodiments include sending a signal to a tethered computer to stop remote rendering.

Further embodiments include increasing a frame rate of the rendering of the view of the scene if the rate of motion is above the threshold.

Some embodiments pertain to a method that includes receiving a position and orientation from a tethered wearable computing device, rendering a frame using the received position and orientation and a scene model and textures for a virtual reality scene, sending the rendered frame to the tethered wearable computing device, receiving a stop rendering signal from the tethered wearable computing device, stopping rendering, receiving a new position and orientation from the tethered wearable computing device, resuming rendering by rendering a new frame using the received new position and orientation, and sending the new rendered frame to the tethered wearable computing device.

In further embodiments the wearable computing device is a head mounted display and wherein the stop rendering signal indicates a high speed head motion of the head mounted display.

Further embodiments include sending scene models and textures to the tethered wearable computing device as a background task during sending rendered frames.

Some embodiment pertain to an apparatus that includes an inertial measurement unit of a wearable computing device to determine a position and orientation of the wearable computing device, a processor coupled to the inertial measurement device to determine a rate of motion of the wearable computing device, to compare the rate of motion to a threshold, and if the rate of motion is above the threshold, then to render a view of a scene at the wearable computing device using the position and orientation information, and a display to show the rendered view of the scene.

Further embodiments include a communications interface and wherein if the rate of motion is below the threshold, then the processor is further to send the determined position and orientation to a tethered computer through the communications interface to receive a rendered frame from the tethered computer based on the sent position and orientation through the communications interface and wherein the display is further to show the received rendered frame.

In further embodiments rendering a view comprises rendering a frame with less detail than a frame received from the tethered computer.

In further embodiments rendering a view comprises rendering a view using a scene model received from the tethered computer and the determined position and orientation.

Some embodiments pertain to a head mounted display that includes an inertial measurement unit to determine a position and orientation of the head-mounted display, an eye tracker to determine a rate of change of a gaze of a user of the head mounted display, a communications interface to receive rendered frames of a virtual reality scene from a tethered computer, a display to receive and show the rendered frames, and a processor coupled to the inertial measurement device and the eye tracker to determine a rate of motion of the wearable computing device and the rate of change of the gaze to respective thresholds and if the rate of motion or the rate of change are above a threshold, then to not send the received frames to the display and instead to render a view of the virtual reality scene at the head mounted display using the position and orientation information, and to send the rendered frames to the display to show the rendered view of the scene.

Further embodiments include increasing a frame rate of the rendering of the view of the scene if the rate of motion is above the threshold.

In further embodiments rendering a view comprises rendering frames at a lower resolution than the received frames.

What is claimed is:

1. A method for rendering a view of a scene, the method comprising:
   in response to a rate of motion of a wearable computing device meeting a predetermined criterion, rendering a view of a scene at the wearable computing device using one or both of position and orientation information;
   in response to the rate of motion of the wearable computing device not meeting the predetermined criterion, sending one or both the position and orientation information to a computer system, and receiving a rendered view of a scene from the computer system based on the sent position and/or orientation information; and
   causing display of the rendered view of the scene.

2. The method of claim 1, wherein the predetermined criterion comprises the rate of motion being greater than a threshold.

3. The method of claim 2, wherein the position and orientation information includes (1) first position of the wearable computing device and/or first orientation of the wearable computing device and (2) second position of the wearable computing device and/or second orientation of the wearable computing device, the method further comprising:
   determining the first position and/or first orientation;
   determining the second position and/or second orientation;
   determining the rate of motion based on the first and second positions and/or the first and second orientations; and
   comparing the rate of motion to the threshold.

4. The method of claim 1, wherein rendering the view of a scene at the wearable computing device comprises rendering a frame with less detail than a frame received from the computer system.

5. The method of claim 4, wherein rendering the frame with less detail comprises rendering the frame with less resolution than a frame received from the computer system.

6. The method of claim 1, wherein rendering the view of a scene at the wearable computing device comprises rendering the view using a scene model received from the computer system.

7. The method of claim 1, further comprising receiving scene models and textures from the computer system before determining the rate of motion of the wearable computing device.

8. The method of claim 1, wherein the wearable computing device is a head-mounted display system and wherein the position and orientation information is obtained from determining the position and orientation at the head-mounted display system using an inertial measurement unit of the head-mounted display system.

9. The method of claim 8, wherein the rate of motion of the wearable computing device is determined based on a rate of change of a gaze of a user wearing the head-mounted display system, and the predetermined criterion is a rate of gaze change threshold, the method further comprising:
determining the rate of change of the gaze of the user of the head-mounted display system; and
comparing the rate of change of the gaze to the rate of gaze change threshold;
wherein if the rate of change of the gaze is above the rate of gaze change threshold, then the rendering of the view of the scene at the wearable computing device is carried out using the position and orientation information.

10. The method of claim 1, further comprising increasing a frame rate of the rendered view of the scene if the rate of motion meets the predetermined criterion.

11. An article of manufacture having one or more non-transitory computer readable storage media storing instructions which when executed by a system causes the system to perform a process for rendering a view of a scene, the process comprising:
in response to a rate of motion of a wearable computing device meeting a predetermined criterion, rendering a view of a scene at the wearable computing device using one or both of position and orientation information;
in response to the rate of motion of the wearable computing device not meeting the predetermined criterion, sending one or both the position and orientation information to a computer system, and receiving a rendered view of a scene from the computer system based on the sent position and/or orientation information; and
causing display of the rendered view of the scene.

12. The article of manufacture of claim 11, wherein the predetermined criterion comprises the rate of motion being greater than a threshold.

13. The article of manufacture of claim 12, wherein the position and orientation information includes (1) first position of the wearable computing device and/or first orientation of the wearable computing device and (2) second position of the wearable computing device and/or second orientation of the wearable computing device, and wherein the operations further comprise
determining the first position and/or first orientation;
determining the second position and/or second orientation;
determining the rate of motion based on the first and second positions and/or the first and second orientations; and
comparing the rate of motion to the threshold.

14. A wearable computing device comprising:
an inertial measurement unit configured to determine position and orientation information of the wearable computing device;
a communications interface;
a processor coupled to the inertial measurement unit and configured to
in response to a rate of motion of the wearable computing device meeting a predetermined criterion, render a view of a scene at the wearable computing device using one or both the position and orientation information,
in response to the rate of motion of the wearable computing device not meeting the predetermined criterion, send one or both the position and orientation information via the communications interface to a computer system, and receiving a rendered view of the scene from the computer system based on the sent position and/or orientation information, and
cause a display to show the rendered view of the scene.

15. The apparatus of claim 14, wherein the predetermined criterion comprises the rate of motion being greater than a threshold.

16. The apparatus of claim 14, wherein the processor is operable to render the view of a scene at the wearable computing device by rendering a frame with less detail than a frame received from the computer system.

17. The apparatus of claim 14, wherein the processor is operable to render the view of a scene at the wearable computing device using a scene model received from the computer system and the position and orientation information.

18. A head-mounted display comprising:
an inertial measurement unit configured to determine one or both position and orientation information of the head-mounted display;
an eye tracker configured to determine a rate of change of a gaze of a user of the head-mounted display;
a processor coupled to the inertial measurement unit and the eye tracker and configured to determine a rate of motion of the head-mounted display, and to render a view of a scene using one or both of the position and orientation information based on one or both of (1) the rate of motion of the head-mounted display and (2) the rate of change of the gaze of the user, meeting predetermined criterion; and
a display configured to show the rendered view of the scene.

19. The head-mounted display of claim 18, wherein the processor is configured to increase a frame rate of the rendered view of the scene if the rate of motion is above a threshold.

20. The head-mounted display of claim 18, wherein the processor is configured to render the view by rendering frames at a lower resolution than rendered frames received from a computer system communicatively coupled to the head-mounted display.

* * * * *